May 2, 1944.  P. M. CHRISTENSEN ET AL  2,347,934
MOTOR STARTER
Filed Jan. 4, 1941  2 Sheets-Sheet 1
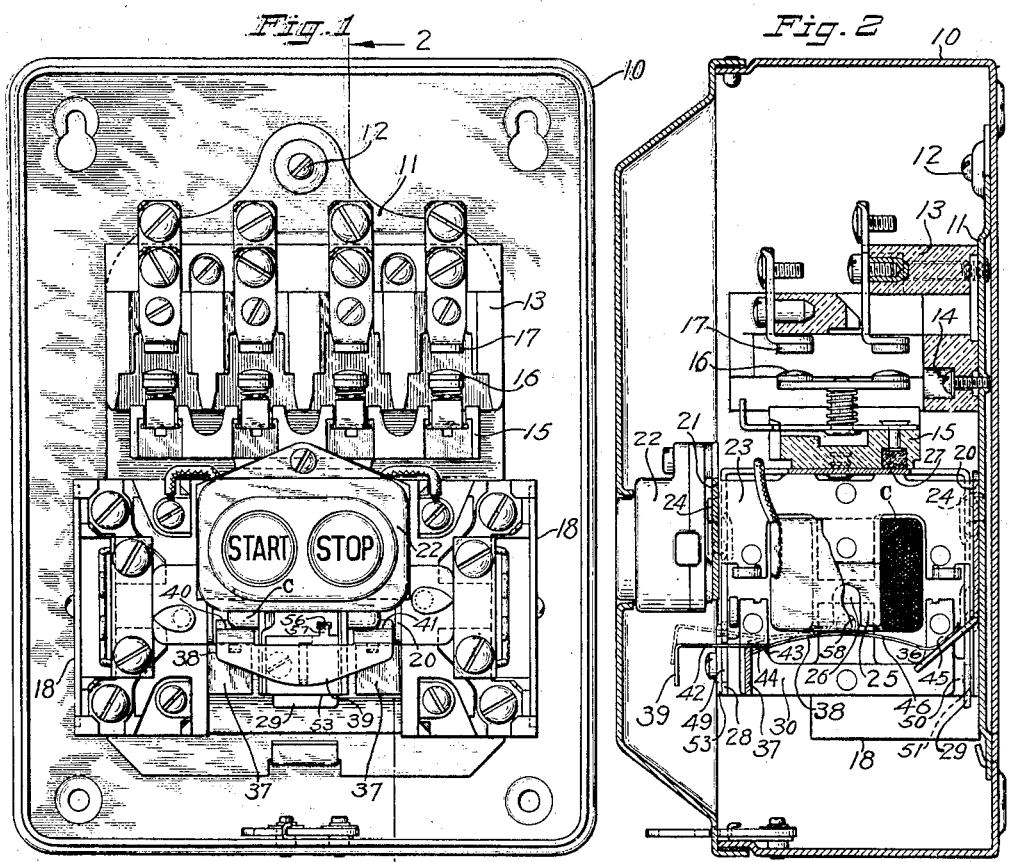
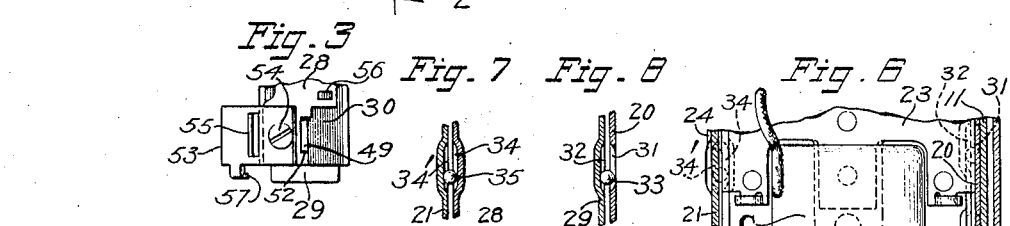
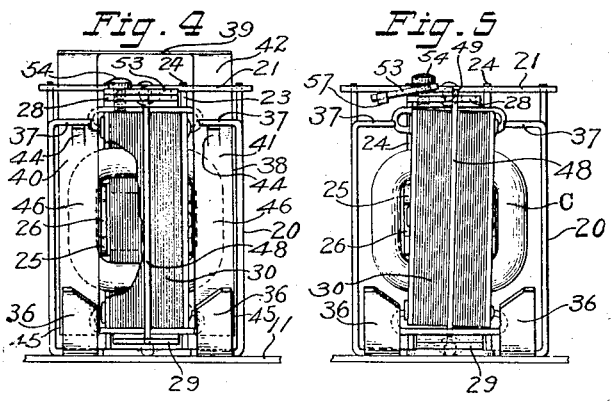
Inventors
Paul M. Christensen
Richard P. Ballou
By S. Jay Tiller
Attorney

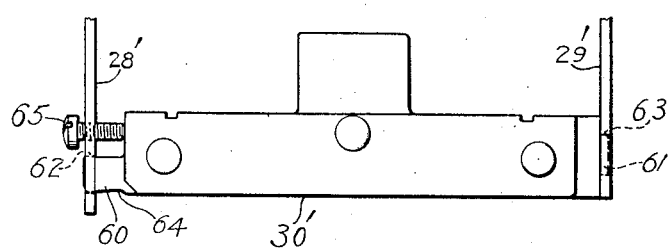
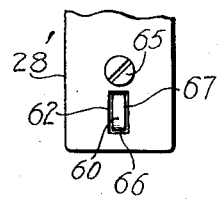
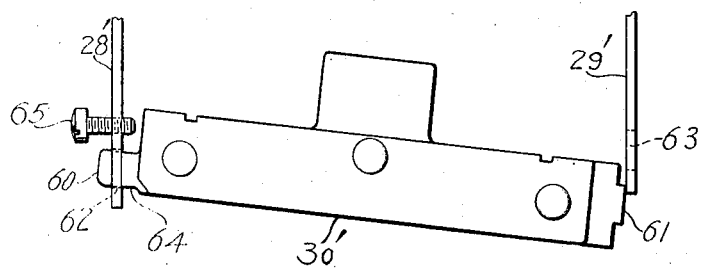

Patented May 2, 1944

2,347,934

UNITED STATES PATENT OFFICE 2,347,934

MOTOR STARTER

Paul M. Christensen, Newington, and Richard P. Ballou, West Hartford, Conn., assignors to Colt's Patent Fire Arms Manufacturing Company, Hartford, Conn., a corporation of Connecticut Application January 4, 1941, Serial No. 373,186

17 Claims. (Cl. 175—336)

The present invention relates to magnetic motor starters wherein an electro-magnet, upon being energized, attracts a movable armature causing movement thereof and instrumentalities connected therewith to effect closing of electric circuits, the armature being adapted to move in the opposite direction when the electro-magnet is de-energized to effect opening the circuits.

An important object of the invention is to provide accurate and easy movement to the movable parts, and stability to the stationary parts of the electro-magnet to obtain the highest possible efficiency during operation, and prevent injury to the parts, as well as accidental opening and closing of circuits, by vibration and shock.

Generally stated, this is accomplished by provision of a sliding carrier or frame for the movable armature having limited guided and stabilized movement in the electro-magnet housing. Anti-friction elements are arranged between the carrier and housing in a manner to provide multi-point suspension of the carrier in the housing and whereby the carrier not only moves smoothly, but also accurately to maintain the armature in substantial alignment with the core, and electric contacts movable with the carrier are kept in alignment with stationarily mounted electrical elements with which they are adapted to be associated to close a circuit. The coil of the electro-magnet, relative to which the armature has reciprocating movement, is normally maintained firmly in place within its housing by a quickly removable yoke-like member through which the armature is freely reciprocable by the electro-magnet; and the coil is easily removable for inspection or replacement.

Another important object of the invention is to provide means for mounting the armatures on their carriers so that they may not only be readily removed and replaced with facility and without disturbing any of the other parts or electrical connections except the coil retaining yoke member, but also allowing some flexibility or rocking movement of the armatures in their carriers to assure true alignment of the armatures relative to the cores when attracted thereby.

The foregoing and other objects and advantages of the invention will become more apparent and will be pointed out in detail during the course of the following description of the accompanying drawings.

In the accompanying drawings we have shown the now preferred embodiment of the invention, but it will be understood that the drawings are intended for illustrative purposes only and are not to be construed as defining or limiting the scope of the invention, the claims forming a part of this specification being relied upon for that purpose.

In the drawings:

Fig. 1 is a front elevational view of an electro-magnetic motor starter embodying the invention, the casing covering being omitted;

Fig. 2 is a sectional view taken on the line 2—2 of Fig. 1;

Fig. 3 is a fragmentary detail view showing the armature latch in open position;

Fig. 4 is an end elevational view of the electro-magnet and its housing with the coil retaining yoke in place, a portion of the armature being broken away;

Fig. 5 is a view similar to Fig. 4 with the coil retaining yoke removed, the armature latch open, and the armature positioned for removal from its support;

Fig. 6 is a fragmentary view partly elevational and partly in section showing the armature partly separated from its supporting frame;

Fig. 7 is a detailed sectional view of fragments of the electro-magnet housing and armature frame or carrier showing a ball bearing in its channel as arranged at the top of the armature frame or carrier;

Fig. 8 is a view similar to Fig. 7 showing one of the ball bearing mountings at the bottom of the armature frame or carrier;

Fig. 9 is a side elevation of an armature and portions of its frame or carrier showing a modification in the means for detachably mounting the armature in said frame or carrier;

Fig. 10 is a fragmentary view showing the end of the front arm of the armature frame or carrier with the means for holding the armature therein in accordance with the modification of Fig. 9; and Fig. 11 is a view similar to Fig. 9 illustrating the manner of inserting and removing the armature of Fig. 9.

Referring to the drawings and particularly to Figs. 1 and 2 thereof, the numeral 10 designates a casing to the bottom of which a base 11 is secured by suitable means such as screw 12. A stationary insulating base 13 is secured to the base 11 by screws 14 extending therethrough and engaging in screw threaded openings in the base 11. A movable insulating contact support 15, is supported for movement relative to stationary insulating base 13, by means hereinafter described in detail, to bring electric contacts 16 into bridging relation with respect to stationary contacts 17 on the stationary insulating base 13. Thermal relays 18 are suitably secured on base 11 for electrical connection with the motor starter and circuits controlled thereby. The present invention does not relate to the foregoing parts so they will not be herein described in detail.

The housing for the electro-magnet is formed from a substantially U-shaped rigid frame 20, riveted or otherwise secured to the base 11, and a plate 21 is mounted across a portion of frame 20 on the ends of its arms. A push button control station 22 is supported on plate 21. The laminated E-shaped core of the electro-magnet is stationarily supported in the housing frame 20 between substantially E-shaped brass plates 23, which extend between the bottom of frame 20 and plate 21. Lugs 24 on the ends of plates 23 are snugly fitted in openings provided therefor in the plate 21 and bottom of frame 20 and base 11, and the ends of the plates 23 are seated against the confronting surfaces of plate 21 and frame 20 so that the core is firmly supported. The middle legs 25 of the plates 23 are longer than the corresponding leg of the E-shaped core and extend therebeyond to receive the coil, as shown best in Fig. 2, and slots 26 are provided in the ends of legs 25 for a purpose later described.

The movable contact support 15 is located between insulating base 13 and magnet housing 20, and is suitably attached to the connecting arm 27 of a substantially U-shaped sliding frame. The other arms 28 and 29 of said U-shaped sliding frame extend across the interior of housing 20 and between the plates 23 adjacent the ends of the core. The armature, as will be later described in detail, is detachably mounted between the lower or free ends of arms 28 and 29 of the sliding frame and in alignment with the core between plates 23. It should be apparent that the sliding frame carries considerable weight since it supports the contact carrier 15 at one side of the core and the armature 30 at the other side of the core. To facilitate movement of the sliding frame and assure accurate movement of the contacts 16 relative to contacts 17, as well as the armature relative to the core, the invention provides an antifriction or ball bearing suspension mounting for the sliding frame so constructed and arranged that smooth, straight guided movement of the frame and mechanism thereon is obtained at all times.

As shown generally in Figs. 2 and 3, and in detail in Figs. 7 and 8, channels are formed in confronting surfaces of arm 28 of the carrier frame and plate 21, and arm 29 of the carrier frame and the bottom of housing 20. There are two such channels between the arm 29 and the bottom of the housing 20. Preferably, though not necessarily, the bottom of the housing 20 is provided with two aligned slots 31 cut completely therethrough, and the arm 29 has two struck-up portions 32 which provide channels for the balls 33 between the bottom of housing 20 and arm 29 when the sliding frame is assembled in operative position in the housing 20. The arm 28 and plate 21 each have formed therein aligned elongated recesses or grooves 34 and 34' respectively, providing channels for the ball 35. Dimensions of the channels relative to the circumference of the balls is such that the frame is maintained against lateral displacement in the housing, and, of course, the channels are of lengths affording sufficient reciprocating movement of the frame to make and break circuits controlled by the motor starter through the contacts 16 and 17.

As previously mentioned, the coil C is mounted on the elongated middle legs 25 of the E-shaped plates 23, and the present invention provides means to firmly hold the coil against accidental displacement during operation of the motor starter. To this end the housing 20 is provided at its bottom with guides 36 arranged below and at opposite sides of the coil. These guides may be conveniently and readily formed by slitting the sheet from which housing 20 is formed to provide for bending the guides up as an integral part of the housing. The guides 36 extend upwardly and outwardly at an angle of substantially 45 degrees with respect to the bottom of the housing 20. Portions of the side walls of the housing at their upper extremities are bent inwardly to form ears 37 above the guides 36 and constitute abutments for the detachable coil holder designated generally by the numeral 38. The coil holder 38 as illustrated comprises a preferably resilient substantially U-shaped yoke-like frame. The connecting arm 39 of the yoke-like frame is arranged substantially at a right angle to the arms 40 and 41 of the yoke-like frame and provides a handle facilitating attachment and detachment of the yoke-like frame relative to the housing 20. Each of the arms on the yoke-like frame 38 has a substantially straight portion 42, extending from the handle 39 downwardly to the shoulders 43 formed on said arms, and a small portion of each arm is bent outwardly adjacent said shoulders to provide tongues 44. The extremities of the arms of the yoke-like frame are curved to facilitate sliding movement thereof along the guides 36, and the portions of the arms 40 and 41 between the shoulders 43 and the extremities 45 are bowed to provide the coil engaging surfaces 46.

In Figs. 2 and 4 the yoke-like frame 38 is shown in solid lines in the position it is compelled to occupy when completely inserted in its coil holding position in the housing 20 and wherein the extremities 45 are engaged with the guides 36, and the tongues 44 are disposed under the ears 37 of the housing 20 to detachably hold the yoke-like frame in the housing with the bowed portions 46 forced against opposite sides of the end of the coil C.

In Fig. 2 the upper end of the yoke-like frame 38 is shown in dotted lines in the position to which it is moved when removal is desired. This is accomplished simply by pressing upwardly on the edge of the handle 39 with the thumb to disengage the tongues 44 from the ears 37 so that the yoke-like frame may then be removed simply by grasping the handle with the thumb and a finger and pulling outwardly. When the yoke-like frame is to be replaced, the extremities 45 are placed behind the ears 37 and moved substantially rectilinearly in a plane approximately perpendicular to the axis of the coil until they engage the guides 36. The construction and relative arrangement of the parts are such that the shoulders 43 will then be substantially in alignment with the ears 37. A quick push on the handle 39 will then cause the extremities 45 to slide on the guides 36 and the tongues 44 to be engaged against the ears 37 at the moment the bowed portions between shoulders 43 and extremities 45 resiliently engage against the end of the coil. As will be readily apparent from Fig. 2, when the yoke-like frame 38 is being inserted into locking position, it is cammed upward a certain amount into resilient contact with the coil by the extremities 45 coacting with guides 36 and the curved portions of the arms adjacent tongues 44 coacting with ears 37, all of which takes place just prior to the engagement of the tongues 44 with the inner sides of ears 37.

As previously mentioned, the armature 30 is mounted between the arms 28 and 29 of the sliding frame which also carries the movable insulating support 15. It will be noted that the arms 28 and 29 of the sliding frame and the armature mounted therebetween are freely movable between the arms of the coil retaining yoke-like plate or frame 38, and the handle 39 of the yoke-like frame 38 is disposed across and in spaced relation to the armature and arm 28 of the carrier frame so that it may be freely manipulated when desired.

The armature 30 is an E-shaped laminated structure to co-operate with the E-shaped core in well-known manner when the core is energized to attract the armature and de-energized to release the armature. The armature includes a relatively thick centrally located rigid plate 48 provided on its ends with lugs 49 and 50 constituting part of the means for detachably mounting the armature in the sliding frame between the arms 28 and 29. The arm 29 is provided with a slot 51 which receives the lug 50, and the end of the arm 28 is cut away at one side, see Fig. 3, and has provided therein a notch or recess 52 for the lug 49 on the other end of the armature. It should be apparent that the armature is insertable between the arms 28 and 29 and removable therefrom by lateral tilting movement relative thereto, that is, when the lug 50 is inserted in the slot 51, the armature occupies the position shown in Fig. 5 with the lug 49 aligned with and in position to enter the notch 52. After the armature has been straightened relative to the arms 28 and 29 from the position of Fig. 5 to the position of Fig. 4, it is established in approximate alignment with the core of the electromagnet. In Figs. 3–5, inclusive, we have shown means for maintaining the armature in the frame, comprising a latch plate 53 on the arm 28 of the sliding frame. The latch plate 53 is swiveled on the arm 28 by screw 54. The plate 53 has a slot 55 adapted to receive the lug 49 when the armature is established in operative position between the arms 28 and 29 with the lug 49 in notch 52. The arm 28 also has an opening 56 adapted to receive the end of lug 57 on plate 53 when the plate is turned from the position of Figs. 3 and 5 to the position of Fig. 4. Obviously, loosening of the screw 54 permits free movement of the plate 53 to effect latching and unlatching of the armature, and when the plate is established in position wherein lug 49 is disposed in slot 55, and lug 57 is disposed in opening 56, tightening of the screw 54 will maintain plate 53 in the position shown in Fig. 4 to hold the armature between the arms of the sliding frame for movement therewith.

As previously mentioned, the legs 25 of the plates 23 which hold the core are provided with slots 26. These slots receive projecting ends 58 of pins extending through the laminations of the armature when the armature is mounted on the sliding frame, as shown in Fig. 2.

Before proceeding with a detailed description of the modification of the invention shown in Figs. 9–11, inclusive, we would point out that the notch 49 in arm 28 of the sliding frame, slot 51 in arm 29, and slot 55 in plate 53 are slightly longer than lugs 49 and 50 to provide for slight clearance. Also the width of the slots 51 and 55 is greater than the thickness of lugs 49 and 50 to provide a greater margin of clearance between the sides of the slots and lugs than that provided between the ends of the slots and lugs. This provision of clearances affords a slightly loose connection between the armature and frame and permits the armature to have rocking movement relative to the frame, or flexibility sufficient to assure alignment of the armature with the core under any conditions which might otherwise interfere with or prevent true alignment. The clearance between the ends of the slots and the edges of the armature is not sufficient to afford pounding during operation of the motor starter.

In Figs. 9–11 we have shown a modification in the means for attaching the armature to the sliding frame or carrier, and the numerals 28' and 29' designate the arms of the frame or carrier corresponding to arms 28 and 29 of Figs. 4–6, inclusive, and 30' designates the armature. The centrally located plate of the armature 30' is provided at its ends with lugs 60 and 61 which engage in openings 62 and 63 in arms 28' and 29', respectively, of the sliding frame or carrier. The lug 60 is relatively long to permit insertion of the armature into the sliding frame or carrier by a vertical tilting movement as illustrated in Fig. 11. The lug 60 is reduced in width adjacent the end of the armature by curving or cutting away a portion of one of its edges as indicated at 64 to facilitate insertion of the armature by said tilting movement. It should be apparent that when the lug 60 has been inserted through opening 62 as illustrated in Fig. 11, the armature can be straightened to align lug 61 with opening 63 in arm 29' so that lug 61 can be placed in opening 63 as shown in Fig. 9. The lug 60 remains in opening 62, and the armature is kept in the sliding frame or carrier against accidental displacement by a screw 65 which is threaded through an opening in arm 28' to engage the confronting end of the armature. The screw is centrally located so as not to prevent the rocking movement provided for the armature previously mentioned and now further described in connection with Fig. 10.

It will be noted by reference to Fig. 10, that there is a slight clearance designated by the numeral 66 between the ends of the openings and the edges of the lugs, and a greater clearance 67 between the sides of the openings and the lugs. These clearances afford rocking movement to the armatures to assure alignment thereof with the cores when the cores are energized and attract the armature, as has been explained.

What we claim is:

1. In an electro-magnet, a housing therefor including opposite walls, a core stationarily mounted in the housing, a coil to energize the core, an armature, a reciprocable U-shaped carrier for the armature connected thereto and having its opposite arms extending along and adjacent to said opposite walls of the housing, the opposed surfaces of said opposite walls and arms respectively having juxtaposed longitudinal recesses therein, and anti-friction elements in and between pairs of said juxtaposed recesses to provide guide means for said U-shaped carrier and armature in their reciprocating movements and to prevent movement of said carrier and armature in a direction transverse to said reciprocating movement.

2. In an electro-magnet, a housing therefor including opposite walls, a core stationarily mounted in said housing, a coil surrounding a portion of the core, a substantially U-shaped carrier juxtaposed to the housing and having its opposite arms arranged in substantially parallel spaced relationship to said opposite walls of the housing and also having the connecting arm of the carrier above the core for abutment therewith to limit movement of the carrier in one direction, the opposed surfaces of the opposite arms of the carrier and opposite walls of the housing respectively having juxtaposed longitudinal recesses therein, an armature operatively connected to said opposite arms of the carrier and disposed in substantial alignment with the axis of the core, and anti-friction elements in and between pairs of said juxtaposed recesses in said arms and walls of the housing to provide guide means for the carrier during the reciprocating movement thereof and to prevent movement of said carrier in a direction transverse to said reciprocating movement thereof.

3. In an electro-magnet, a housing therefor including a pair of opposite walls, a core stationarily mounted in the housing, a coil surrounding a portion of the core, a reciprocable substantially U-shaped carrier having the opposite arms thereof respectively spaced from and substantially parallel to said opposite walls of the housing, the opposed surfaces of said opposite walls and arms respectively being formed with one of a pair of opposed substantially parallel channels extending parallelly to the direction of reciprocation of said carrier, an armature operatively connected to the carrier, and anti-friction elements disposed in and between each of said pairs of channels to provide guide means for the carrier and prevent movement of the carrier in a direction transverse to the reciprocating movement thereof.

4. In an electro-magnet, a housing therefor including a pair of opposite walls, a core stationarily mounted in the housing, a coil surrounding a portion of the core, a reciprocable substantially U-shaped carrier having the opposite arms thereof respectively spaced from and substantially parallel to said opposite walls of the housing, the opposed surfaces of one of said casing walls and one of said arms respectively being formed with one of a pair of opposed substantially parallel channels and the opposed surfaces of the other casing wall and arm being formed with a plurality of pairs of opposed substantially parallel channels and all of said channels extending substantially parallelly to the direction of reciprocation of said carrier, an armature operatively connected to the carrier, and anti-friction elements disposed in and between each of said pairs of channels to provide guide means for the carrier and prevent movement of the carrier in a direction transverse to the reciprocating movement thereof.

5. An electro-magnet including a housing having one open side and containing a stationary core surrounded by a coil of greater length than said core and movable through said open side of said housing to dispose the same on the core and said electro-magnet also including a movable armature having a portion movable into said coil for engagement with the core, in combination with coil holding means movable in a direction transverse to the axis of the coil and adapted to abut the end of the coil nearest said open end of the housing to retain the coil in operative position in the housing, means on the housing engaging the coil holding means to maintain it in engagement with said coil, and quick detachable means for detachably securing the coil holding means against removal from engagement with said means on said housing.

6. An electro-magnet including a housing having one open side and containing a stationary core surrounded by a coil of greater length than said core and movable through said open side of said housing to dispose the same on the core and said electro-magnet also including a movable armature having a portion movable into said coil for engagement with the core, in combination with a plurality of spaced spring plates disposed on opposite sides of said armature and movable in a direction transverse to the axis of the coil and also adapted to abut the end of the coil nearest said open end of the housing to retain the coil in operative position in the housing, means on the housing engaging said plates to maintain the same in engagement with said coil and against movement in a direction parallel to the axis of the coil, and quick detachable means for detachably securing said plates against removal from engagement with said means on said housing in a direction longitudinally of said plates.

7. An electro-magnet including a housing having one open side and containing a stationary core surrounded by a coil of greater length than said core and movable through said open side of said housing to dispose the same on the core and said magnet also including a movable armature having a portion movable into said coil for engagement with the core, in combination with a U-shaped member having arms comprising spring plates disposed on opposite sides of said armature and movable in a direction transverse to the axis of the coil and also adapted to abut the end of the coil nearest said open end of the housing to retain the coil in operative position, means on the housing engaging said plates to maintain the same in engagement with said coil and against movement in a direction parallel to the axis of the coil, and quick detachable means for detachably securing said plates against removal from engagement with said means on said housing in a direction longitudinally of said plates.

8. An electro-magnet including a housing having one open side and containing a stationary core surrounded by a coil of greater length than said core and movable through said open side of said housing to dispose the same on the core and said electro-magnet also including a movable armature having a portion movable into said coil for engagement with the core, in combination with a plurality of spaced spring plates disposed on opposite sides of said armature and movable in a direction transverse to the axis of the coil and also adapted to abut the end of the coil nearest said open end of the housing to retain the coil in operative position in the housing, projections on the housing engaging spaced portions of said plates to maintain the same in engagement with said coil and against movement in a direction parallel to the axis of the coil, and quick detachable means for detachably securing said plates against removal from engagement with said projections on said housing in a direction longitudinally of said plates.

9. An electro-magnet including a housing having one open side and containing a stationary core surrounded by a coil of greater length than said core and movable through said open side of said housing to dispose the same on the core and said magnet also including a movable armature having a portion movable into said coil for engagement with the core, in combination with a plurality of spaced spring plates disposed on opposite sides of said armature and movable through one face of said housing in a direction transverse to the axis of the coil and also adapted to abut the end of the coil nearest said open end of the housing to retain the coil in operative position in the housing, projections on the housing engaging spaced portions of said plates to maintain the same in engagement with said coil and against movement in a direction parallel to the axis of the coil, one of said projections engaging each plate having a cam surface adapted to engage the inner end of each plate upon movement through said housing face toward its operative position whereby the plates are cammed into contact with said coil, and quick detachable means for detachably securing said plates against removal from engagement with said projections on said housing in a direction longitudinally of said plates.

10. An electro-magnet including a housing having one open side and containing a stationary core surrounded by a coil of greater length than said core and movable through said open side of said housing to dispose the same on the core and said electro-magnet also including a movable armature having a portion movable into said coil for engagement with the core, in combination with a plurality of spaced spring plates disposed on opposite sides of said armature and movable to operative position through one face of said housing in a direction transverse to the axis of the coil, said plates being adapted to engage the end of the coil nearest the open end of the housing and said plates also being medially bowed toward said end of the coil, projections on the housing engaging spaced portions of said plates to maintain the same in engagement with said coil and against movement in a direction parallel to the axis of the coil, and quick detachable means for detachably securing said plates against removal from engagement with said projections on said housing in a direction longitudinally of said plates.

11. An electro-magnet including a housing having one open side and containing a stationary core surrounded by a coil of greater length than said core and movable through said open side of said housing to dispose the same on the core and said electro-magnet also including a movable armature having a portion movable into said coil for engagement with the core, in combination with a plurality of spaced spring plates disposed on opposite sides of said armature and movable in a direction transverse to the axis of the coil and also adapted to abut the end of the coil adjacent said open end of the housing to retain the coil in operative position, projections on the housing engaging spaced portions of said plates to maintain the same in engagement with said coil and against movement in a direction parallel to the axis of the coil, and a detent on each of said plates respectively adapted to engage one of said projections on the housing to provide quick detachable latch means for detachably securing said plates against removal from engagement with said projections on said housing in a direction longitudinally of said plates.

12. An electro-magnet including a core having an energizing coil therefor and an armature movable in a fixed path extending axially of the coil and core, in combination with a pair of spaced arms connected at one end for unitary movement in a path parallel to the path of the armature and having the other ends respectively free and extending away from the base of the core for engaging spaced portions of said armature to support the same for movement with said arms, the coengaging portions of said armature and the free ends of said arms being respectively provided with interfitting means to detachably secure the armature to the free ends of said arms and permit detachment of the armature therefrom while the coil and arms remain in their relatively operative positions.

13. An electro-magnet including a core having an energizing coil therefor and an armature movable in a fixed path extending axially of the coil and core, in combination with a U-shaped member movable in a path parallel to the path of the armature and having the outer free ends thereof extending away from the base of the core for engaging spaced portions of said armature to support the same for movement therewith, the coengaging portions of said armature and the free ends of the U-shaped member being respectively provided with interfitting means to detachably secure the armature to said free ends of the U-shaped member and permit detachment of the armature therefrom while the coil and arms remain in their relatively operative positions.

14. An electro-magnet including a core having an energizing coil therefor and an armature movable in a fixed path extending axially of the coil and core, in combination with a pair of spaced arms connected at one end for unitary movement in a path parallel to the path of the armature and having the other ends respectively free and extending away from the base of the core for engaging spaced portions of said armature to support the same for movement with said arms, and connecting means comprising interfitting lugs and lug receiving openings respectively disposed in the free ends of said arms and spaced portions of said armature to detachably secure the armature to said free ends of the arms and permit detachment of the armature therefrom while the coil and arms remain in their relatively operative positions.

15. An electro-magnet including a core having an energizing coil therefor and an armature movable in a fixed path extending axially of the coil and core, in combination with a pair of spaced arms connected at one end for unitary movement in a path parallel to the path of the armature and having the other ends respectively free and extending away from the base of the core for engaging spaced portions of said armature to support the same for movement with said arms, and connecting means comprising interfitting lugs and lug receiving openings respectively disposed in the free ends of said arms and spaced portions of said armature to detachably secure the armature to said free ends of the arms and permit detachment of the armature from said free ends of the arms while the coil and arms remain in their relatively operative positions, the openings of said connecting means being sufficiently larger than the lugs received therein to permit limited movement of the armature with respect to the arms for providing proper seating of the armature when in contact with the core.

16. An electro-magnet including a core having an energizing coil therefor and an armature movable in a fixed path extending axially of the coil and core, in combination with a pair of spaced arms connected at one end for unitary movement in a path parallel to the path of the armature and having the other ends respectively free and extending away from the base of the core for engaging spaced portions of said armature to support the same for movement with said arms, said free ends of the arms each being provided with an opening therein, lugs on said spaced portions of said armature adapted to be respectively disposed in said openings in said free ends of the arms to detachably secure the armature thereto and permit detachment of the armature therefrom while the coil and arms remain in their relatively operative positions, and means on one of said arms adapted to detachably maintain said lugs in their respective openings.

17. An electro-magnet including a core having an energizing coil therefor and an armature movable in a fixed path extending axially of the coil and core, in combination with a pair of spaced arms connected at one end for unitary movement in a path parallel to the path of the armature and having the other ends respectively free and extending away from the base of the core for engaging spaced portions of said armature to support the same for movement with said arms, one of said arms having a slot therein adjacent the free end thereof and the other arm having an open sided notch therein adjacent the free end thereof, lugs on said spaced portions of said armature for respective disposition in said slot and notch in said arms, and means detachably secured to said notched arm for closing said notch and removably securing the armature lug therein to thus detachably secure the armature to the free ends of said arms.

PAUL M. CHRISTENSEN.
RICHARD P. BALLOU.